United States Patent [19]

Phares

[11] 4,023,238
[45] May 17, 1977

[54] STUFFING MACHINE WITH TELESCOPING NOZZLE

[75] Inventor: Michael W. Phares, Cedar Falls, Iowa

[73] Assignee: Rheem Manufacturing Company, New York, N.Y.

[22] Filed: Dec. 3, 1975

[21] Appl. No.: 637,378

[52] U.S. Cl. .................................. 17/41; 53/183; 141/392
[51] Int. Cl.² ...................................... A22C 11/02
[58] Field of Search ............ 17/41, 42, 35, 36, 37, 17/38, 39, 40, 33, 49, 1 F; 141/392; 53/183, 197

[56] References Cited

UNITED STATES PATENTS

| 723,072 | 3/1903 | Thom | 141/195 |
|---|---|---|---|
| 2,676,442 | 4/1954 | Gaubert | 53/183 |
| 3,924,666 | 12/1975 | Raison | 141/231 |

FOREIGN PATENTS OR APPLICATIONS

| 2,251,931 | 6/1974 | Germany | 53/197 |
|---|---|---|---|
| 2,420,202 | 11/1975 | Germany | 17/33 |
| 8689/61 | 2/1959 | Japan | 17/39 |
| 122,749 | 9/1948 | Sweden | 17/41 |

*Primary Examiner*—F. Barry Shay
*Attorney, Agent, or Firm*—Allegretti, Newitt, Witcoff & McAndrews

[57] ABSTRACT

An improved stuffing horn construction for a sausage making machine includes a T-shaped nozzle having a separate, attached telescoping nozzle for discharge of sausage meat. The telescoping nozzle is adjustable relative to the casing brake to prevent smearing of fat on the sausage casing, when filling the casing with sausage. Additionally, the telescoping nozzle may be adjusted subsequent to filling of the sausage casing in order to permit clipping or sealing of the casing end.

6 Claims, 3 Drawing Figures

STUFFING MACHINE WITH TELESCOPING NOZZLE

BACKGROUND OF THE INVENTION

This invention relates to an improved stuffing horn construction for a sausage making machine.

Comminution of meat or the like and subsequent packaging thereof in a casing material has long been a popular way for marketing such products, particularly sausage meat products. The processes for grinding, packaging and otherwise preparing sausage products have been highly mechanized. There are, for example, mechanisms which discharge pulverized or ground meat from a nozzle into a sausage casing. After a measured amount of meat material is so discharged, the machine automatically clips or seals the ends of the sausage casing and repeats the process continuously to form additional sausages.

Generally, the sausage casing material is placed on a discharge nozzle or stuffing horn associated with the sausage machine. A ground meat product then feeds into the casing simultaneously pulling or removing the casing from the stuffing horn. Generally, some type of braking mechanism encircles the end of the stuffing horn to control the release of the casing material. After the sausage casing is filled, a clipper mechanism or sealer closes the end of the sausage casing.

One problem associated with such a procedure for filling a sausage casing is that meat flowing from the stuffing horn or nozzle tends to form a fat smear which adheres to the inner surface of the casing. This makes the meat product unattractive and does not accurately represent the contents of the sausage casing.

In order to overcome this objectionable visual effect, various stuffing horn or discharge nozzle constructions have been proposed. Kielsmeier et al, U.S. Pat. No. 3,473,190 and Henderson, U.S. Pat. No. 1,617,848 both disclose a shaped end for a stuffing horn. The shaped end is designed to eliminate fatty deposits on the inside of the sausage casing. Various other patents disclose a stuffing horn construction designed to achieve additional benefits in the making of a sausage product. Among these patents are Atkinson U.S. Pat. No. 658,521, Thom U.S. Pat. No. 723,072, Dyrek U.S. Pat. No. 2,313,229, Gunuskey U.S. Pat. No. 990,547, Kupcikevicius U.S. Pat. No. 3,621,513, Swiss Pat. No. 122,749 and German Pat. No. 1287470.

While the foregoing prior art references disclose various utilitarian stuffing horn constructions, alternate or improved constructions and results are desirable.

SUMMARY OF THE INVENTION

In a principal aspect, the present invention comprises an improved stuffing horn construction for attachment to the meat discharge orifice of a sausage making machine comprising a first tube directly attached to the discharge orifice for receipt of sausage at the intake end thereof. The first tube also includes a discharge end and an optional connected pressure control mechanism for controlling the pressure of sausage material being discharged at the discharge end. A second tube is telescopically fitted over the discharge end of the first tube and includes a casing support end and nozzle projecting into sausage casing. The second tube is slidable over the first tube and may be adjusted relative to a casing brake and a clipper to prevent fatty deposits from forming on the inside of the casing.

It is thus an object of the present invention to provide a stuffing horn construction which substantially eliminates or reduces the amount of fatty deposit that can accumulate on the inside surface of sausage casing material.

It is a further object of the present invention to provide an improved stuffing horn construction having a minimum number of movable parts and providing means for improving the visual appearance of sausage discharged into a casing.

Still a further object of the present invention is to provide a novel sausage stuffing horn compatible with existing sausage making equipment.

Another object of the present invention is to provide a two-part, telescoping sausage discharge nozzle, the length of which may be adjusted relative to a casing brake cooperative with the discharge nozzle.

These and other objects, advantages and features of the invention will be set forth in the detailed description which follows.

BRIEF DESCRIPTION OF THE DRAWING

In the detailed description which follows, reference will be made to the drawing comprised of the following Figures.

DESCRIPTION OF THE PREFERRED EMBODIMENT

Figure 1:
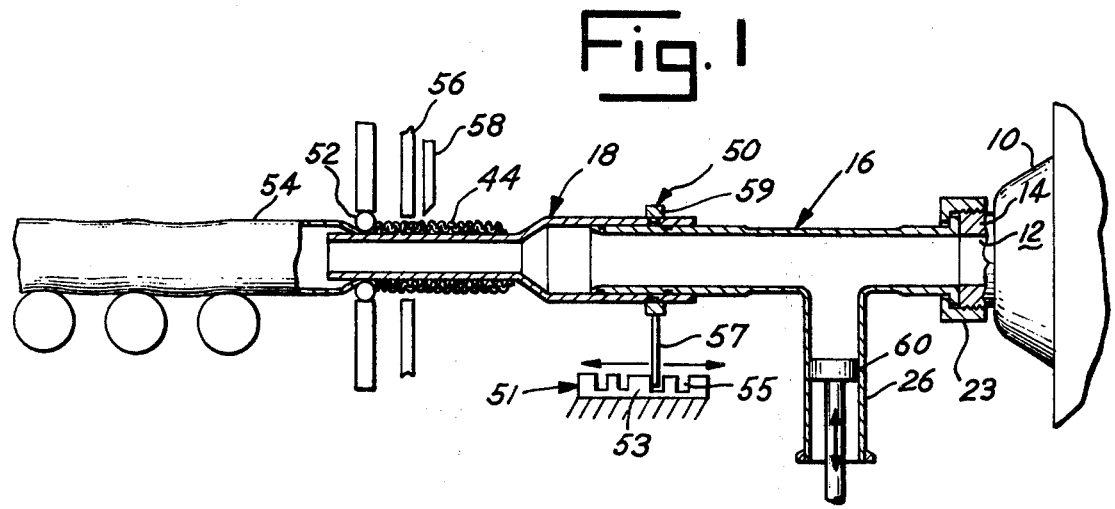
FIG. 1 is a schematic cross-sectional view of the improved stuffing horn of the present invention in combination with a typical sausage making machine.
Figure 2:
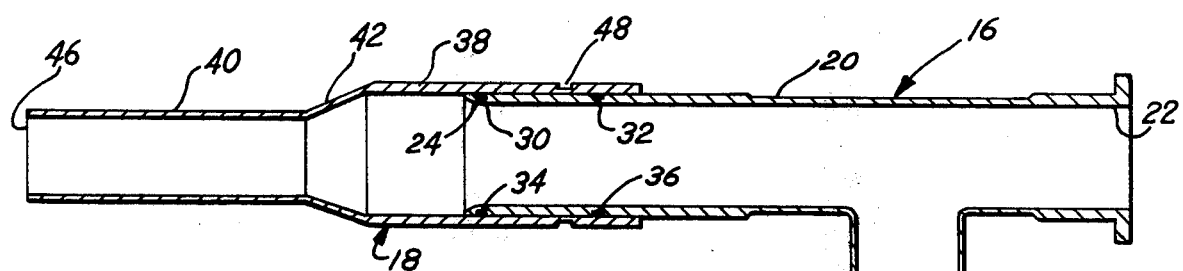
FIG. 2 is an enlarged cross-sectional view of the improved stuffing horn of the invention in a partially projected position.
Figure 3:
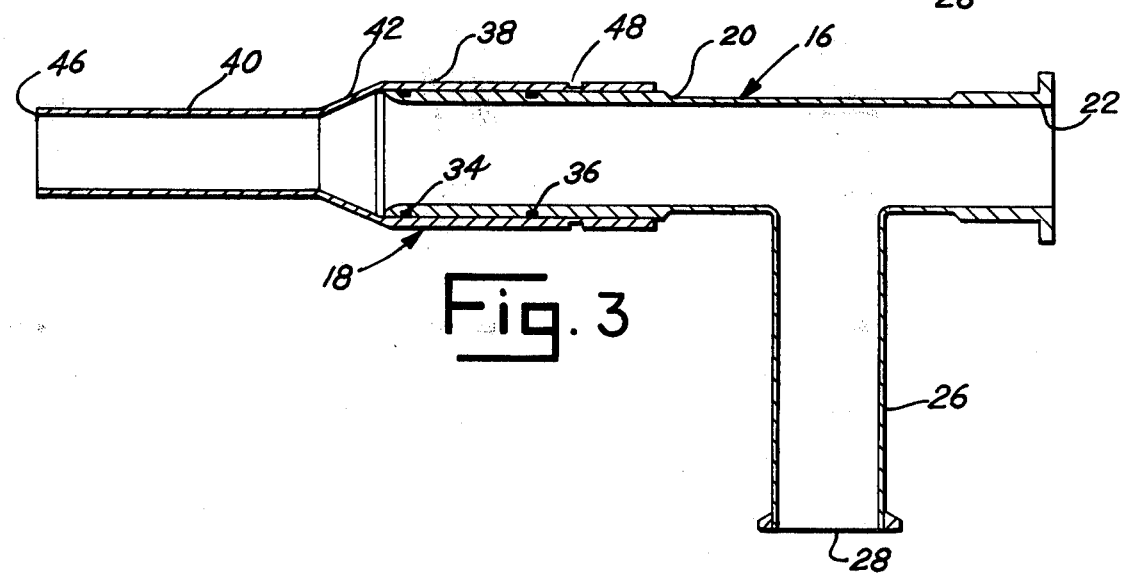
FIG. 3 is a cross-sectional view of the stuffing horn of FIG. 2 in a retracted position.

Referring first to FIG. 1, the improved stuffing horn of the invention is illustrated in combination with a sausage making machine 10. Machine 10 has a threaded discharge orifice 12 including a threaded fitting 14 that defines the orifice 12.

As shown in the FIGURES, the stuffing horn of the present invention includes a first, T-shaped stationary tube 16 and a second telescoping tube 18 cooperative with the first tube 16. Thus, tube 16 includes a straight line, substantially cylindrical tube section 20 having an inlet end 22 and an outlet end 24. Tube 20 is of sufficient diameter to permit passage of the comminuted material discharged through orifice 12. End 22 is retained on fitting 14 by thread nut 23.

In the embodiment disclosed, the first tube 16 includes a downwardly projecting pressure control extension tube 26 which joins with tube 20 to define the T-shaped tube 16. Section 26 includes a pressure control inlet 28.

Adjacent the outlet 24 on the outer surface of section 20, are a pair of spaced circumferential grooves 30 and 32. O rings 34 and 36 respectively are placed in grooves 30 and 32 respectively.

The second or telescoping tube 18 includes a first or telescoping section 38 having an internal diameter slightly greater than the external diameter of the section 20 of tube 16. Thus, sections 20 and 16 are generally cylindrical in shape with section 38 slidably mounted on section 20 and maintained in a substantially sealed relationship by means of O ring seals 34 and 36. Section 38 includes a circumferential groove 48 which cooperates with a telescope adjustment mechanism.

Telescoping tube 18 also includes a forward or discharge nozzle section 40 connected by transition 42 with section 38. Section 40 is likewise preferably cylindrical in shape for receipt of pleated casing 44 as shown in FIG. 1. Section 40 includes a discharge outlet 46.

In operation, sausage material or the like is discharged through orifice 12 into section 20 of tube 16. By proper telescoping of tube 18 upon tube 16 through operation of an adjustment mechanism 50, the nozzle section or leading end section 40 of tube 18 is projected an appropriate distance beyond a braking mechanism 52 into filled casing 54. Braking mechanism 52 is provided to engage shirred or pleated sausage casing 44 against section 40 as known to those skilled in the art. Braking mechanism 52 thus retards the release of casing 44 from section 40 and is generally adjustable.

Section 40 projects beyond brake mechanism 52 into the interior of filled casing 54. Projection of the section 40 in the manner described has been found to prevent accumulation of fatty deposits on the inside surface of the filled casing 54 thereby providing a more aesthetic appearance for the product maintained in the filled casing 54.

The telescoping tube 18 is maintained in the projected position illustrated in FIG. 1 until the casing 54 is filled to an adequate length. Means 57 for maintaining the adjustment mechanism 50 in a fixed position are schematically illustrated in FIG. 1. For example, a block 53 with slots 55 may cooperate with pin 57 attached to tube holder 59. The tube 18 is then withdrawn or moved to the right in FIG. 1 by transferring pin 57 to a different slot 55 in order to permit operation of a clipper or tie off device 56 and cut off knife 58. Alternatively, a piston and cylinder (not shown) may be attached between pin 57 and a fixed bracket to control the relative extension of tube 18 on tube 16.

Clipper 56 is of any type well known to those skilled in the art. The function of clipper 56 is to attach a clip or tie about the casing 44 thereby preventing leakage of material from the casing 54. The knife 58 then separates the filled casing 54 from the unfilled casing 44.

Section 26 of tube 16 is connected with means to provided reverse suction upon sausage material being discharged through the stuffing horn assembly. For example, as shown schematically a control piston 60 may be operated or moved downward as shown in FIG. 1 to provide reverse suction of sausage material in nozzle section 18. Reverse suction and removal of sausage material is useful or desirable just prior or subsequent to fastening a clip and sealing off the end of the filled sausage casing 54. That is, after the casing 54 is gathered for attachment of a clip or the like, reverse suction withdraws material from the region where the casing 54 is gathered to prevent tearing of the casing and to eliminate residue of sausage material at the clipped end of the casing.

It will be noted that the operation and particular construction of the sausage filling machine 10 may require a different sequence of movements by the telescoping section 18 of the stuffing horn other than that described previously. For example, the clipper 56 and brake mechanism 52 may be arranged differently, thus necessitating a different distance or sequence of movement by the telescoping tube 18. The assembly is, however, flexible in operation and may accommodate any desired sequence of telescoping operations. Also, note that pressure control extension 26 is optional and may be eliminated.

While in the foregoing, there has been set forth a preferred embodiment of the invention, it is to be understood that the invention shall be limited only by the following claims and their equivalents.

What is claimed is:

1. In a sausage stuffing machine, having a sausage discharge orifice the improvement of a stuffing horn assembly for attachment to the discharge orifice of the sausage machine, said improvement comprising, in combination:
  a. a first tube having a discharge end and an intake end for connection to the discharge orifice;
  b. a longitudinally telescoping tube having a telescoping portion with an internal diameter slightly greater than the external diameter of the first tube and fitted on the discharge end of the first tube, said telescoping tube having an outlet end and being longitudinally adjustable along said discharge end, and means on said outlet end for receiving sausage casing thereover whereby the outlet end of the telescoping tube may be inserted partially within a sausage casing during the filling operation and longitudinally withdrawn therefrom during gathering and closing of the casing end; and
  c. seal means intermediate the telescoping portions of the tubes.

2. The improved assembly of claim 1 including means connected with said first tube for controlling pressure of sausage material through said assembly.

3. The improved assembly of claim 1 wherein said first tube includes a connecting passage and means to control discharge pressure from said assembly through said connecting passage.

4. The improved assembly of claim 1 including means for fixing and maintaining the position of the telescoping tube relative to the first tube.

5. The improved assembly of claim 1, said means on said outlet end including a portion of the telescoping tube adjacent the outlet end for receipt of pleated sausage casing material.

6. The improved assembly of claim 1 wherein said telescoping tube connects by means of a narrowing transition section with a cylindrical outlet end, the outlet end having a diameter less than the telescoping portion.

* * * * *